United States Patent [19]
Hazama

[11] Patent Number: 5,450,413
[45] Date of Patent: Sep. 12, 1995

[54] MEANS FOR DETECTING TDMA SIGNAL MULTIPLEXING POSITION IN A STAR NETWORK MASTER TERMINAL SYSTEM

[75] Inventor: Hisamichi Hazama, Kawasaki, Japan

[73] Assignee: Fujitsu Limited, Kanagawa, Japan

[21] Appl. No.: 214,619

[22] Filed: Mar. 17, 1994

[30] Foreign Application Priority Data

Sep. 20, 1993 [JP] Japan .................. 5-233195

[51] Int. Cl.⁶ .............................................. H04J 3/06
[52] U.S. Cl. ................. 370/100.1; 370/95.3; 370/110.1
[58] Field of Search ............... 370/95.3, 100.1, 104.1, 370/105.1, 105.2, 105.4; 340/825.44; 348/540; 375/106, 114

[56] References Cited

U.S. PATENT DOCUMENTS

| | | | |
|---|---|---|---|
| 4,488,170 | 12/1984 | Nillesen | 348/540 |
| 4,759,040 | 7/1988 | Kawata et al. | 370/105.1 |
| 5,072,445 | 12/1991 | Nawata | 370/104.1 |
| 5,122,691 | 6/1992 | Balakrishnan | 370/110.1 |
| 5,231,636 | 7/1993 | Rasmussen | 370/100.1 |
| 5,296,849 | 3/1994 | Ide | 340/825.44 |
| 5,303,241 | 4/1994 | Takada et al. | 370/100.1 |

Primary Examiner—Douglas W. Olms
Assistant Examiner—Shick Hom

[57] ABSTRACT

A master terminal system for a star network is provided wherein a master station transmits a continuous signal to a plurality of terminal stations, and each terminal station transmits a signal to the master station according to a time-division multiple access procedure. A deviation of the signal originated by a terminal station from a proper position can be measured even by an unskilled person, without the need to use a measuring instrument such as a synchroscope. When a signal is supplied from a particular terminal station to the time slot specified by a time slot setting switch, a unique word detecting circuit detects a unique word for a predetermined time period at least longer than the time width of the unique word which is to be detected in this time slot. If input of the unique word is detected within the predetermined time period, a display section shows the detection of the unique word, thus making it possible to ascertain that the signal from the particular terminal station has been multiplexed at the proper position. The predetermined time period can be set as desired so that it may be narrowed stepwise about the proper position of the unique word. In this case, the amount of deviation of the unique word, contained in the signal originated by the particular terminal station, from the proper position can be obtained.

10 Claims, 13 Drawing Sheets

| | ADDRESS | OUT |
|---|---|---|
| 0 | 0 0 0 0 0 0 0 0 | 0 |
| 1 | 0 0 0 0 0 0 0 1 | 0 |
| 2 | 0 0 0 0 0 0 1 0 | 0 |
| 3 | 0 0 0 0 0 0 1 1 | 0 |
| ⋮ | ⋮ | ⋮ |
| 118 | 0 1 1 1 0 1 1 0 | 0 |
| 119 | 0 1 1 1 0 1 1 1 | 1 |
| 120 | 0 1 1 1 1 0 0 0 | 1 |
| ⋮ | ⋮ | ⋮ |
| 136 | 1 0 0 0 1 0 0 0 | 1 |
| 137 | 1 0 0 0 1 0 0 1 | 0 |
| ⋮ | ⋮ | ⋮ |
| 255 | 1 1 1 1 1 1 1 1 | 0 |

FIG. 4

| ADDRESS | DATA (CLOCK) |
|---|---|
| 0 [00000000] | +127 |
| 1 [00000001] | +127 |
| 2 [00000010] | +126 |
| ⋮ | ⋮ |
| 64 [01000000] | +63 |
| 65 [01000001] | +62 |
| ⋮ | ⋮ |
| 127 [01111111] | +1 |
| 128 [10000000] | 0 |
| 129 [10000001] | −1 |
| ⋮ | ⋮ |
| 220 [11011100] | −92 |
| 221 [11011101] | −93 |
| ⋮ | ⋮ |
| 254 [11111110] | −126 |
| 255 [11111111] | −127 |

FIG. 12

| ADDRESS | DATA ($\mu s$) |
|---|---|
| 0 [00000000] | +54 |
| 1 [00000001] | +64 |
| 2 [00000010] | +63 |
| ⋮ | ⋮ |
| 64 [01000000] | +93 |
| 65 [01000001] | +33 |
| 66 [01000000] | +32 |
| ⋮ | ⋮ |
| 126 [01111110] | +1 |
| 127 [01111111] | 0 |
| 128 [10000000] | 0 |
| 129 [10000001] | 0 |
| 130 [10000010] | −1 |
| ⋮ | ⋮ |
| 220 [11011100] | −46 |
| 221 [11011101] | −46 |
| 222 [11011101] | −47 |
| ⋮ | ⋮ |
| 253 [11111111] | −63 |
| 254 [11111110] | −64 |
| 255 [11111111] | −64 |

FIG. 13

MEANS FOR DETECTING TDMA SIGNAL MULTIPLEXING POSITION IN A STAR NETWORK MASTER TERMINAL SYSTEM

BACKGROUND OF THE INVENTION

1. Field of the Invention

The present invention relates to a master terminal system for a star network wherein a master station transmits a continuous signal carrying identical data to a plurality of terminal stations and the terminal stations transmit respective signals to the master station according to a time-division multiple access procedure, and more particularly, to a master terminal system for a star network in which the master station detects a deviation of multiplexing position of the signals transmitted from the terminal stations by using an inexpensive device, without requiring special firmware.

2. Description of the Related Art

Recently, among other satellite communications, star network for satellite communications has attracted attention wherein a signal from a single master station is received equally by a plurality of terminal stations in the network, and construction of practical systems is being attempted. This is because in satellite communications, divergent geographical conditions of terminal stations need not be taken into account on the part of the master station, facilitating construction of extensive broadcast communication systems.

In many one-to-N star network systems for satellite communications composed of one master station and N terminal stations, the master station transmits a signal in the form of a continuous wave (single carrier wave) to the terminal stations in broadcast mode, whereas each terminal station transmits a signal to the master station in certain multiplex mode. Particularly, in cases where the number of terminal stations is large (e.g., $N \geq 100$), a time-division multiple access (TDMA) procedure wherein time-division multiplexing is effected using an identical carrier frequency for intermittent transmission is more suitable for the transmission of signals from the terminal stations to the master station and is easier to introduce than other procedures such as frequency-division multiplexing and code multiplexing.

Generally, in satellite communications, the transmission distance between the satellite and an earth station varies due to attitude control operations of the satellite in an orbit, causing variation of received clock frequency as a result of Doppler shift. Thus, data cannot always be received at stable timing. Taking the circumstances into account, satellite communications utilize a synchronizing word (hereinafter referred to as "unique word") which is inserted in a predetermined position of transmitted data, so that the receiving side can detect the unique word and use the detected position as a reference when detecting the data. Unique word detection methods include an open type wherein received signals are monitored at all times to detect a unique word, and an aperture type wherein a time zone during which a unique word may probably be received is predicted by suitable means, a monitoring time frame called aperture window is set corresponding to the predicted time zone, and the received signal is monitored only within the time frame to detect input of a unique word.

In the time-division multiple access (TDMA) procedure, each terminal station sends its own transmit signal, is allotted a time slot position for multiplexing, and transmits a unique word and data within a time slot period assigned thereto, according to the precision prescribed by the network. It is, therefore, easy for the master station to predict the unique word position in each time slot, and thus the master station uses the aperture method for the detection of unique words.

The width (time width) of the aperture window varies depending on the communication method, clock frequency, frequency stability of transmitting stations (particularly, that of the master station in a network), control period, quantization error associated with digital processing, and other factors, and is usually determined in consideration of these factors.

Meanwhile, in cases where the line communication speed is high, the line information efficiency (the ratio of true information to the total information transmitted through the line) lowers if the width of the aperture window is increased. Accordingly, the width of the aperture window is reduced, and a dynamic control is carried out on a real-time basis. In cases where the line communication speed is low, on the other hand, the width of the aperture window can be increased to a considerable extent, whereby proper operation is ensured even if the position of a unique word in a transmitted signal is slightly deviated. Namely, the position of the unique word in a signal transmitted from each of the terminal stations is slightly deviated from its proper position due to geographical conditions of the terminal stations. Thus, a unique word detection method using a wide aperture window is effective for a transmission system (i.e., a fixed transmission control system) wherein measurement of the aforesaid deviation and adjustment of the transmission timing are carried out at the time of installation of terminal stations, and signals are transmitted thereafter ignoring the deviation of the unique word position from the proper position.

In one-to-N star networks for satellite communications, the aforementioned fixed transmission control technique is employed because the information transmitted from a terminal station to the master station includes only control information and monitor information and the information efficiency is not an important factor in determining the transmission method to the used, and also because terminal stations should preferably be inexpensive.

In conventional one-to-N star network for satellite communications using the fixed transmission control technique, the master station is, if it detects a deviation of the unique word position originated by a terminal station from the proper position during operation, unable to cope with the situation on a real-time basis, and thus has neither detecting means nor notifying means. Further, it is not practical in view of cost to provide the master station with firmware for the purpose of only temporarily detecting the deviation at the time of installation of terminal stations. Under the circumstances, a determination as to whether a signal transmitted from a terminal station at the time of installation is properly multiplexed at a proper position is conventionally made at the master station by using a measuring instrument such as a synchroscope.

This confirmation work using a measuring instrument such as a synchroscope, however, can be performed only by an expert who is accustomed to the measuring instrument, has knowledge of monitor points in the master station, and is skilled in the technical evaluation of measurement results, etc. Moreover, each time a terminal station is installed, such a skilled person must carry the measuring instrument to the master station.

Further, in cases where the period (control frame length) at which each terminal station transmits a local signal is long, e.g., several tens of seconds, such a long-period signal may not be displayed at the synchroscope, making the confirmation work difficult.

Furthermore, where a determination as to whether the position of a unique word transmitted from a particular terminal station is deviated from the proper position is made at the master station during operation, and not at the time of installation of the terminal station, a measuring instrument such as a synchroscope must inevitably be connected to the master station, lowering the maintainability of networks under operation.

SUMMARY OF THE INVENTION

A first object of the present invention is to provide a master terminal system for a star network which does not require a measuring instrument such as a synchroscope, or an expert, to measure a deviation of a signal originated by a terminal station from a proper position.

A second object of the present invention is to provide a master terminal system for a star network which facilitates the measurement of the amount of deviation of a signal originated by a terminal station from proper timing and which is capable of displaying the result of the measurement in easy-to-understand form.

A third object of the present invention is to provide a master terminal system for a star network which is improved in maintainability of the network under operation.

A fourth object of the present invention is to provide a master terminal system for a star network which can greatly facilitate maintenance work.

To achieve the above objects, the present invention provides a master terminal system for a star network in which a master station transmits a continuous signal to a plurality of terminal stations, and each terminal station transmits a signal to the master station according to a time-division multiple access procedure. The master terminal system comprises frame generating means for counting a number of time slots successively supplied thereto after a frame start and a number of clock signals in each time slot, based on a frame timing signal and a clock signal in a received signal, and outputting the counted numbers as a time slot count value and a clock count value, respectively, aperture window generating means for generating an aperture window signal having a width at least equal to a time width of a unique word, at a position where the unique word should be within the time slot, based on the clock count value output from the frame generating means, input means for entering a number representing an order of a predetermined time slot within a frame, search pulse generating means for generating a search pulse having a predetermined width at least greater than the time width of the unique word when the time slot count value output from the frame generating means coincides with the number of order of the time slot supplied from the input means, OR operation means for outputting, as a gate signal, a result of a logic OR operation performed on the aperture window signal generated by the aperture window generating means and the search pulse generated by the search pulse generating means, unique word detecting means for detecting the unique word contained in the received signal, and for outputting a detection pulse if the gate signal is being supplied thereto from the OR operation means when the unique word is detected, and display means for indicating that the unique word has been detected in the predetermined time slot, based on a result of a logic OR operation performed on the detection pulse output from the unique word detecting means and the search pulse generated by the search pulse generating means.

With the arrangement described above, when a signal is supplied from a particular terminal station to the time slot specified by the input means, the unique word detecting means detects a unique word for a predetermined time period at least longer than the time width of the unique word which is to be detected in this time slot. If unique word input is detected within the predetermined time period, the display means shows the detection of the unique word, thus making it possible to confirm that the signal from the particular terminal station has been multiplexed at the proper position.

Preferably, the search pulse generating means includes setting means for setting the width of the search pulse to a desired width, whereby the aforesaid predetermined time period can be set to a desired value by the setting means. Accordingly, by decreasing the predetermined time period stepwise about the proper position of the unique word, it is possible to learn the amount of deviation of the unique word, contained in the signal originated by the particular terminal station, from the proper position.

Also provided is a master terminal system for a star network, which comprises frame generating means for counting a number of time slots successively supplied thereto after a frame start and a number of clock signals in each time slot, based on a frame timing signal and a clock signal in a received signal, and outputting the counted numbers as a time slot count value and a clock count value, respectively, aperture window generating means for generating an aperture window signal having a width at least equal to a time width of a unique word, at a position where the unique word should be within the time slot, based on the clock count value output from the frame generating means, input means for entering a number representing an order of a predetermined time slot within a frame, search pulse generating means for generating a search pulse having a predetermined width at least greater than the time width of the unique word when the time slot count value output from the frame generating means coincides with the number of order of the time slot supplied from the input means, OR operation means for outputting, as a gate signal, a result of a logic OR operation performed on the aperture window signal generated by the aperture window generating means and the search pulse generated by the search pulse generating means, unique word detecting means for detecting the unique word contained in the received signal, and for outputting a detection pulse if the gate signal is being supplied thereto from the OR operation means when the unique word is detected, counting means for counting a number of the clock signals, the counting by the counting means being started at rise timing of the search pulse generated by the search pulse generating means, latch means for latching the count value of the counting means when the detection pulse is output from the unique word detecting means, and display means for displaying an amount of deviation of the unique word, detected by the unique word detecting means, from a proper position based on the count value latched by the latch means.

With this arrangement, the extent to which the unique word in the signal from a particular terminal station is deviated from the proper position is detected by the counting means and the latch means, and is numerically displayed at the display means, whereby the amount of deviation of the unique word from the proper position can be easily confirmed with the eye.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 illustrates a conversion table in an aperture window generator;

FIG. 12 illustrates a conversion table in a deviation value converting circuit; and FIG. 13 illustrates another conversion table for the deviation value converting circuit.

DESCRIPTION OF THE PREFERRED EMBODIMENTS

Embodiments of the present invention will be described in detail with reference to the accompanying drawings.

Figure 1:
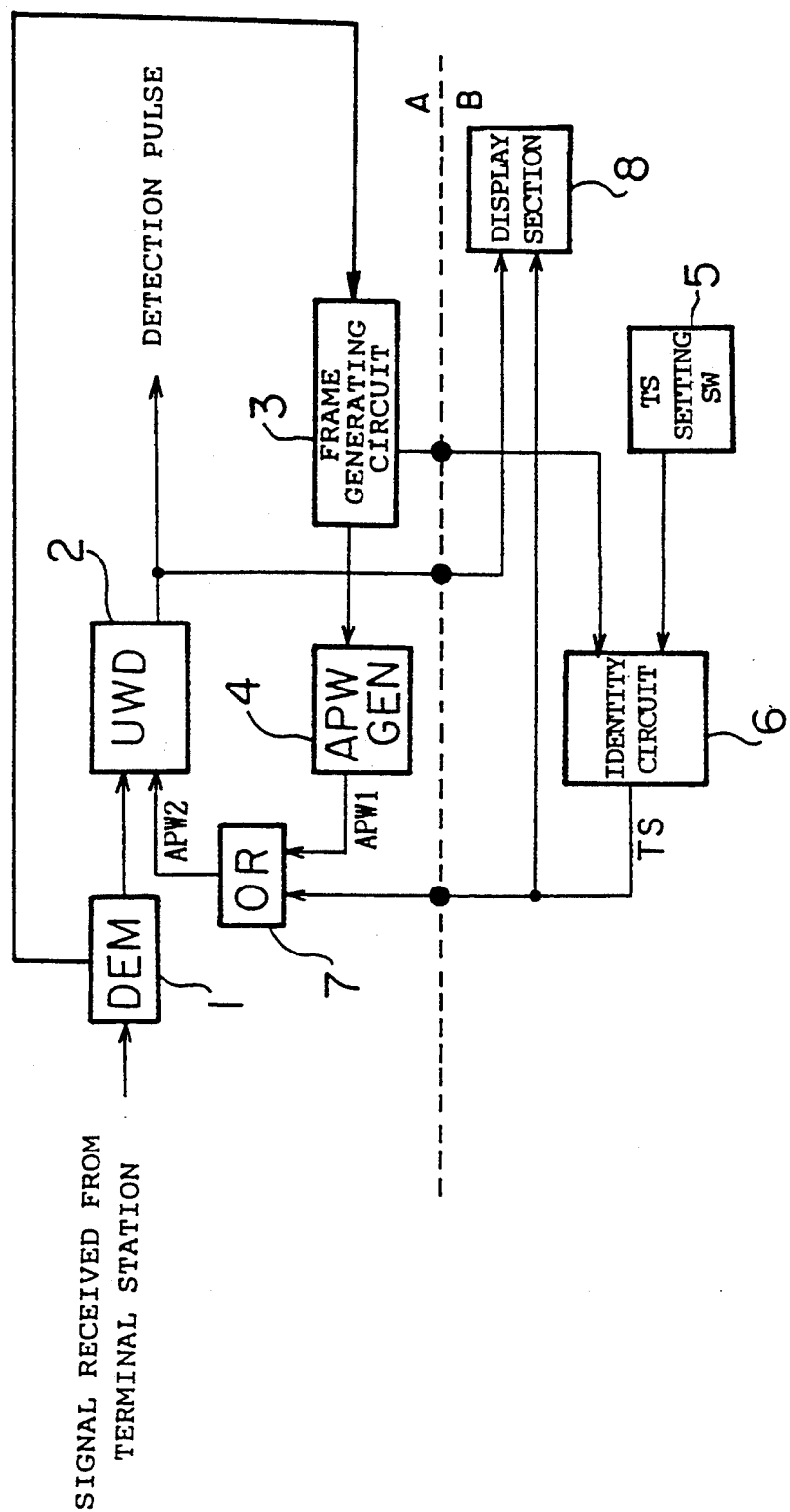
FIG. 1 is a block diagram of a master terminal system according to a first embodiment of the present invention.

FIG. 1 is a block diagram of a master terminal system according to a first embodiment of the present invention, and illustrates, in particular, a position deviation detector for determining whether a signal transmitted from a terminal station is multiplexed at a proper time-division position. In the figure, a demodulating circuit (DEM) 1 demodulates the received signal to obtain a digital signal. The digital signal obtained is a signal with a frame format, and includes a frame timing signal and a plurality of time slots corresponding to respective terminal stations. Each time slot includes a unique word indicating the reference position of corresponding data.

A unique word detecting circuit (UWD) 2 is connected to the demodulating circuit 1, and monitors the demodulated digital signal at all times. When a unique word is contained in the demodulated digital signal, the unique word detecting circuit 2 outputs a detection pulse only for a time period during which it is supplied with an aperture window signal APW2, mentioned later. Namely, the aperture window signal APW2 functions as a gate signal for the unique word detecting circuit 2.

A frame generating circuit 3 counts the number of time slots successively supplied thereto after a frame start, based on the frame timing signal and clock signals supplied thereto, and outputs the resultant value as a time slot count. Also, the frame generating circuit 3 counts the number of input clock signals for each time slot, and outputs the resultant value as a clock count. The arrangement of the frame generating circuit 3 will be described in detail later with reference to FIG. 3.

An aperture window generator (APWGEN) 4 is connected to the frame generating circuit 3, and based on the clock count value supplied from the circuit 3, generates a pulse APW1 having a width slightly greater than a maximum allowable time width for unique word, at a position where the unique word should be within the time slot. The arrangement of the aperture window generator 4 will also be described in detail later with reference to FIG. 3. The maximum allowable time width is the sum of a time width assigned to one unique word and an allowable deviation time associated with transmission timing of each terminal station.

A time slot setting switch 5 serves as input means for specifying one of a plurality of time slots within a frame by the number of order in the frame, and comprises, for example, a 6-bit on-off switch or a combination of a decimal numeral-based input device and a converter for converting the output of the input device into a binary numeral. Specifying a particular time slot is equivalent to specifying a particular terminal station.

An identity circuit 6 is connected to the frame generating circuit 3 and the time slot setting switch 5, and generates a signal TS having a pulse width equal to the time slot width when the time slot count supplied from the frame generating circuit 3 coincides with the number of order of the time slot supplied from the time slot setting switch 5. The arrangement of the identity circuit 6 will be described in detail later with reference to FIG. 5.

An OR circuit 7 is connected to the aperture window generator 4 and the identity circuit 6, and performs a logic OR operation on the pulse APW1 generated by the aperture window generator 4 and the signal TS generated by the identity circuit 6, the result obtained being supplied to the unique word detecting circuit 2 as the aperture window signal APW2.

A display section 8 is connected to the unique word detecting circuit 2 and the identity circuit 6, and comprises an AND circuit, a multivibrator, and an LED device, none of which are shown. The AND circuit performs a logic AND operation on the detection pulse output from the unique word detecting circuit 2 and the signal TS generated by the identity circuit 6. Then, based on the output of the AND circuit, the multivibrator generates a pulse longer than the frame length, and the LED device lights an LED thereof in accordance with this pulse. The LED is lighted for a period long enough to ensure a visual confirmation that the unique word has been detected in the specified time slot.

The operation of the position deviation detector constructed as above will be now described with reference to FIG. 2.

Figure 2:
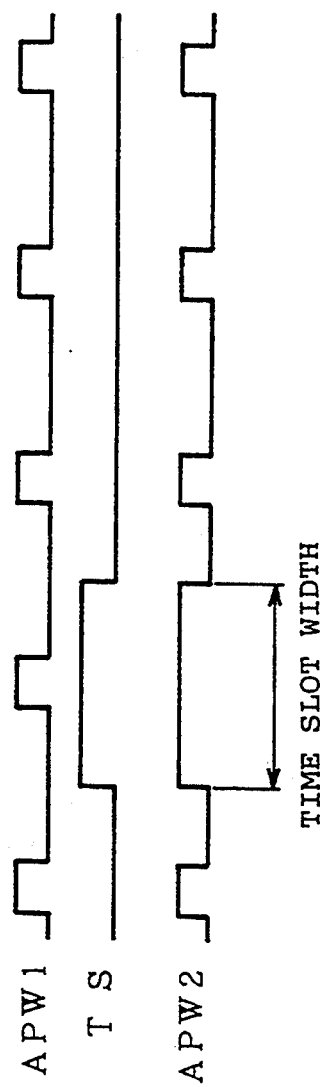
FIG. 2 is a chart illustrating signal waveforms observed at various parts in the first embodiment.

FIG. 2 is a chart illustrating signal waveforms observed at various parts in the first embodiment. Specifically, the pulse APW1 is generated by the aperture window generator 4 at each position where the unique word should be within each time slot, and has a width slightly greater than the maximum allowable time width for unique word. The signal TS turns to high-level for a time period equivalent to the width of a time slot in which the signal transmitted from a terminal station as the object of measurement is to be multiplexed. The result of the logic OR operation on the pulse APW1 and the signal TS corresponds to the aperture window signal APW2, and the unique word detecting circuit 2 detects a unique word only for a time period in which the aperture window signal APW2 remains at high-level. Thus, the pulse APW1 is used as an aperture window when the unique word detecting circuit 2 detects a unique word contained in individual time slots of a received digital signal, and the signal TS is used as an aperture window that ensures the detection of a unique word contained in a signal transmitted from a terminal station as the object of measurement even in the case where the position of the unique word is fairly deviated from the proper position. Therefore, when a signal is transmitted from a terminal station at the time of installation, it is possible to confirm readily with the eye that the signal is multiplexed at a proper time slot position and not other time slot position, though a deviation of the signal from the proper timing is undetectable. In other words, the time slot in which the signal from a particular terminal station should be multiplexed is specified, and the detection of a unique word is carried out only for the width of this time slot by the open detection method, thereby making it possible to visually confirm that a signal initially transmitted from a terminal station at the time of installation is multiplexed at the proper time slot position and not other time slot position. The open detection method permits such confirmation, without requiring needless fine adjustment of the transmission timing on the part of the terminal station. Further, the time slot can be specified easily through an operation of the time slot setting switch 5; therefore, in cases where the above confirmation fails to be made, another time slot may be specified, making it possible to easily determine at which time slot position the signal from a particular terminal station is multiplexed.

As indicated by the dashed line and symbols A and B in FIG. 1, the time slot setting switch 5, the identity circuit 6, and the display section 8 may be formed as an additional package separate from the body of the master system so that the package may be detachable from the master system. In this case, the device for detecting the deviation of a unique word from the proper position can be provided as an additional package and may be attached to the master station when required. Thus, the position deviation detector can be completely isolated from the master system, and fault of the system due to erroneous operation or erroneous specification of the detector can be prevented, thereby improving the operational stability of the master station.

The provision of the additional package, however, requires a separate interface circuit capable of satisfactorily interfacing the devices.

Figure 3:
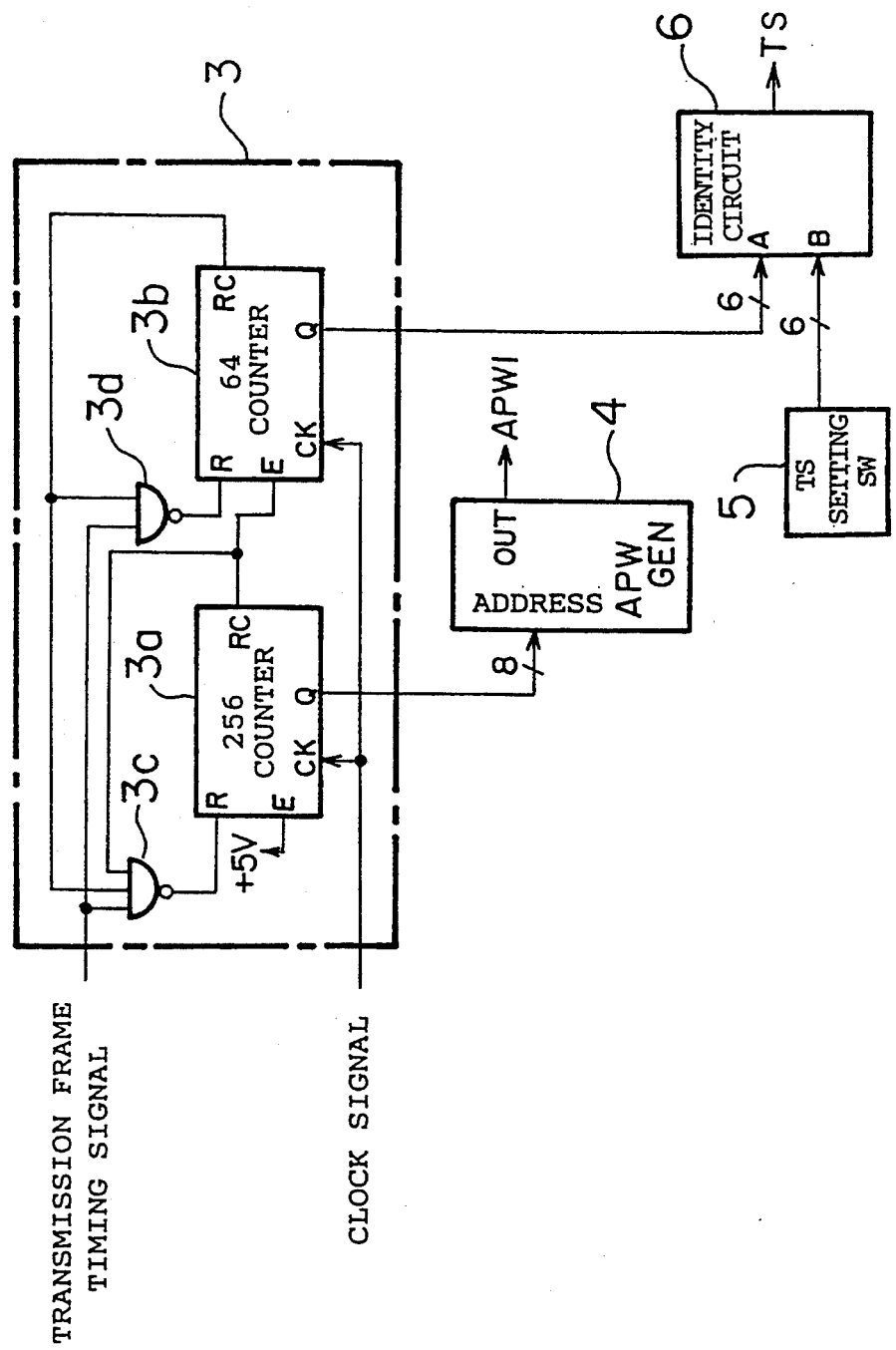
FIG. 3 is a circuit diagram illustrating details of a frame generating circuit etc.

FIG. 3 is a circuit diagram illustrating the arrangement of the frame generating circuit 3, etc. in detail. The following description is based on the assumption that the width of a time slot corresponds to 256 bits (clock pulses), the number of time slots within one frame is 64, the width of the pulse APW1 corresponds to 17 bits, and that the pulse APW1 is positioned in the middle along the width of a time slot such that the middle position of the pulse APW1 corresponds to the 128th bit from the beginning of the time slot.

The frame generating circuit 3 comprises a 256 counter 3a for counting the number of clock signals supplied thereto in each time slot and outputting the resultant value as the clock count, a 64 counter 3b for counting the number of time slots successively supplied thereto after the frame start and outputting the resultant value as the time slot count, and NAND circuits 3c and 3d. The 256 counter 3a is reset at the input timing of every new time slot, and the count thereof is incremented up to "256" in response to the clock signal. The 64 counter 3b is reset when supplied with the frame timing signal, and the count thereof is incremented at the input timing of every new time slot up to "64." In FIG. 3, symbol R denotes the reset terminal, E denotes the enable terminal, RC denotes the ripple-carry terminal, CK denotes the clock terminal, and Q denotes the output terminal.

The output of the 256 counter 3a is supplied, in the form of 8-bit parallel signal, to the address terminal of the aperture window generator 4. The aperture window generator 4 comprises a ROM, and upon receiving the 8-bit parallel signal at the address terminal thereof, provides an output OUT as the pulse APW1 in accordance with a conversion table shown in FIG. 4. As seen from the conversion table of FIG. 4, the aperture window generator 4 generates the output "1" as the pulse APW1 while the count of the 256 counter 3a is within the range from "119" to "136." That is, the pulse APW1 turns to high-level at the 119th bit from the beginning of each time slot for an interval corresponding to 17 bits.

Figure 5:
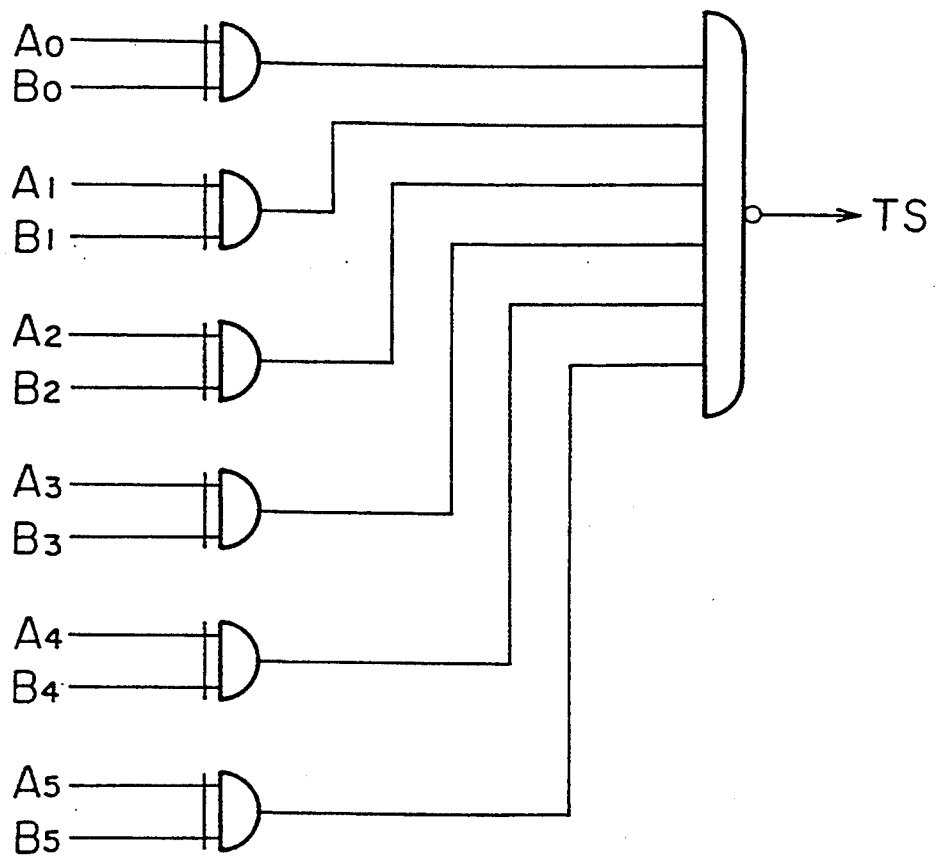
FIG. 5 is a circuit diagram illustrating the internal arrangement of an identity circuit.

The output of the 64 counter 3b is supplied, in the form of 6-bit parallel signal, to A terminals (A0 to A5) of the identity circuit 6. Also, the output of the time slot setting switch 5 is supplied, in the form of 6-bit parallel signal, to B terminals (B0 to B5) of the identity circuit 6. As shown in FIG. 5, the identity circuit 6 is composed of six EX-OR circuits and a NAND circuit, and outputs the signal TS only when the bit signals supplied to the A terminals (A0 to A5) coincide, respectively, with those supplied to the B terminals (B0 to B5). Namely, the signal TS turns to high-level only for a time period in which the time slot specified by the time slot setting switch 5 is to be received.

A second embodiment of the present invention will be now described.

Figure 6:
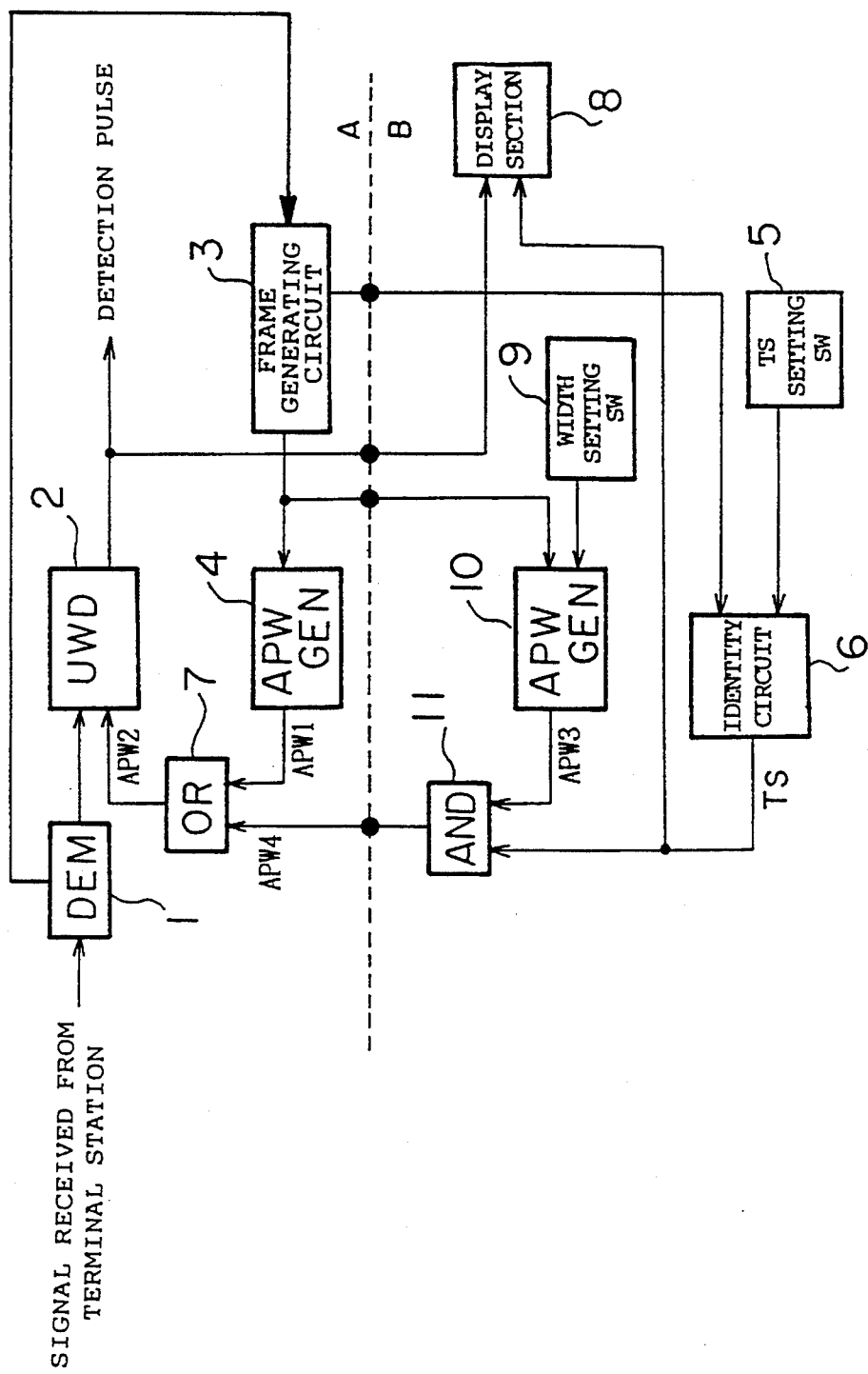
FIG. 6 is a block diagram of a master terminal system according to a second embodiment of the present invention.

FIG. 6 is a block diagram of a master terminal system according to the second embodiment of the invention, and illustrates, in particular, a detector for detecting the deviation of a unique word from the proper position. According to the second embodiment, the width of the signal TS mentioned with reference to the first embodiment can be externally set as desired. The arrangement of the second embodiment is basically identical with that of the first embodiment; therefore, like reference numerals and symbols are used to denote like elements, and description of such elements is omitted. Only the different features will be described below.

A width setting switch 9 serves as width input means which permits external setting of the width of the signal TS, and comprises, for example, a 5-bit on-off switch. The output of the width setting switch 9 is supplied, in the form of 5-bit parallel signal, to an aperture window generator (APWGEN) 10. The aperture window generator 10 is also supplied with the clock count value from the frame generating circuit 3 as an 8-bit parallel signal. The aperture window generator 10 comprises a ROM, and has address terminals A0 to A7 to which the clock count value is supplied from the frame generating circuit 3, and address terminals A8 to A12 to which the output of the width setting switch 9 is supplied. Further, the aperture window generator 10 stores a conversion table shown in FIG. 8, and generates a pulse APW3 corresponding to the addressing, in accordance with the conversion table. Like the first embodiment, the example shown in FIG. 8 is based on the assumption that the width of a time slot corresponds to 256 bits (clock pulses), the number of time slots within one frame is 64, the width of the pulse APW1 corresponds to 17 bits, and that the pulse APW1 is positioned in the middle along the width of a time slot such that the middle position of the pulse APW1 corresponds to the 128th bit from the beginning of the time slot.

Figure 8:
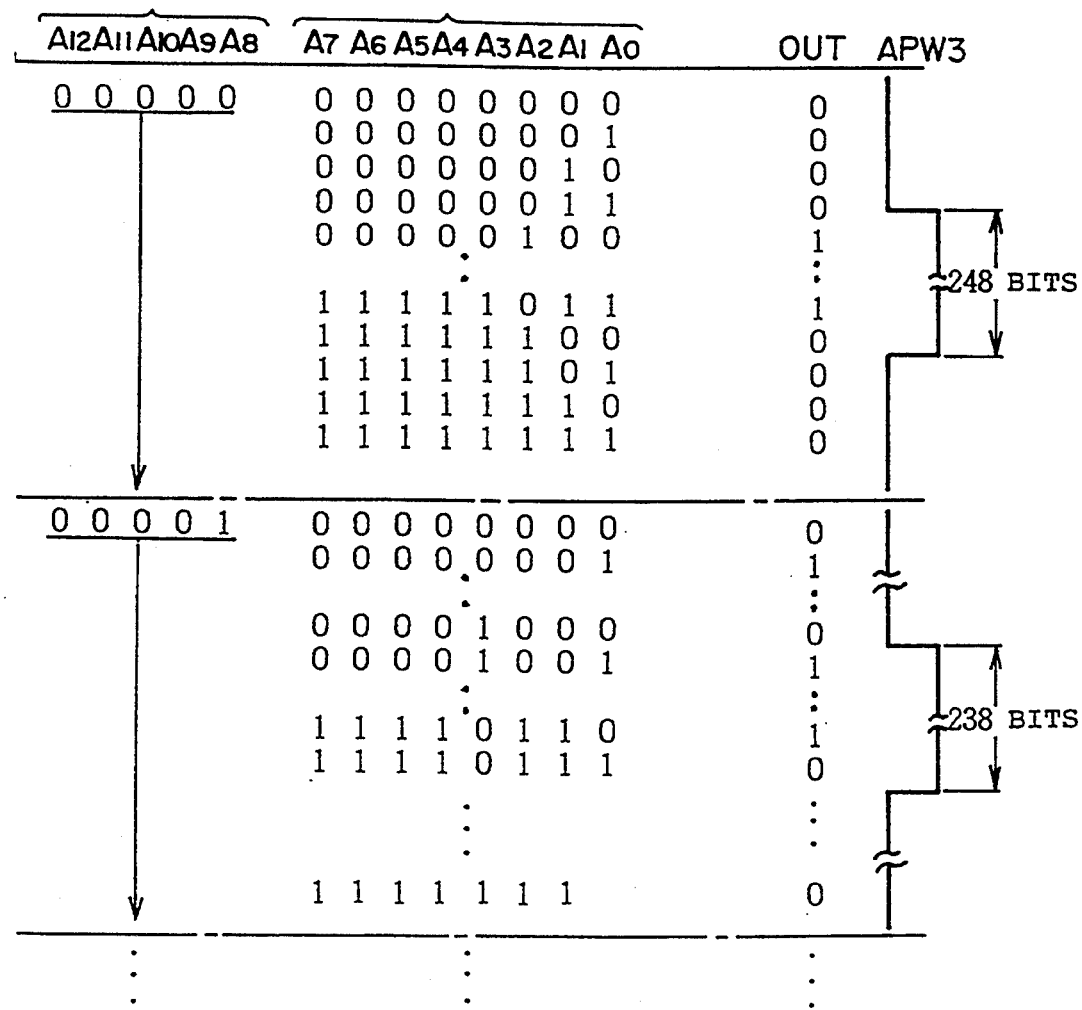
FIG. 8 illustrates a conversion table in an aperture window generator.

As shown in FIG. 8, when the output of the width setting switch 9 is "00000", the pulse APW3 turns to high-level for an interval corresponding to 248 bits positioned in the middle along the width of each time slot, and when the output of the width setting switch 9 is "00001", the pulse APW3 turns to high-level for 238 bits. Although not illustrated in FIG. 8, the width of the pulse APW3 is set to 32 different widths in accordance with the output value of the width setting switch 9. Each of the 32 widths of the pulse APW3 is smaller than the width of the time slot and greater than the width of the pulse APW1. In this manner, the aperture window generator 10 generates the pulse APW3 having a width specified by the width setting switch 9, in the middle position of each time slot.

An AND circuit 11 (FIG. 6) is connected to the aperture window generator 10 and the identity circuit 6, performs a logic AND operation on the pulse APW3 from the aperture window generator 10 and the signal TS from the identity circuit 6, and outputs the result to the OR circuit 7 as a pulse APW4.

Figure 7:
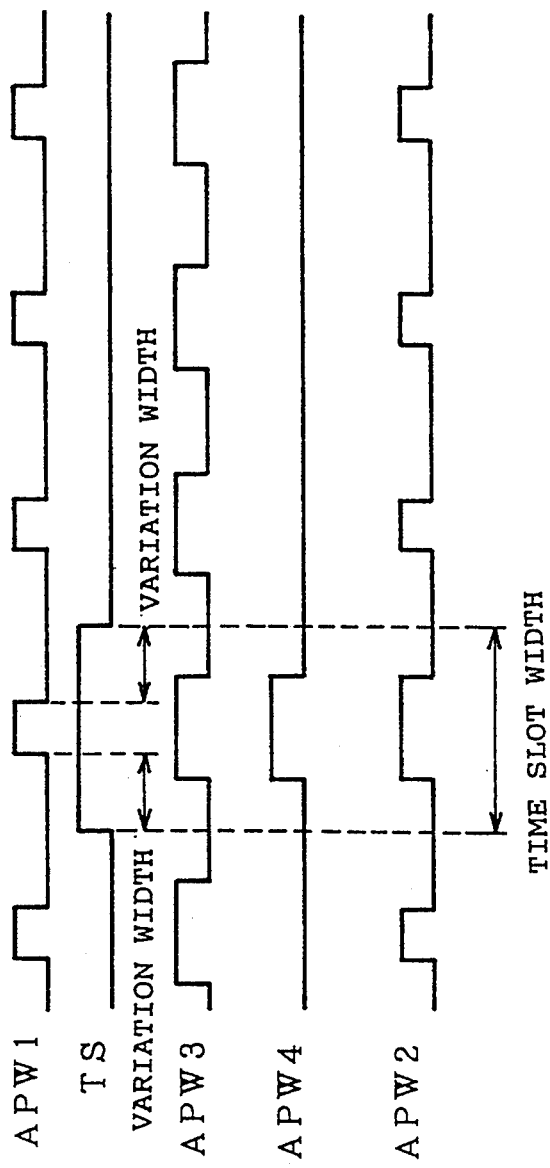
FIG. 7 is a chart illustrating signal waveforms observed at various parts in the second embodiment.

FIG. 7 illustrates various signal waveforms including those of the pulses APW3 and APW4. The width of the pulse APW3 is set to a desired width on condition that the pulse width is smaller than the time slot width of the signal TS and greater than the width of the pulse APW1. Among the pulses APW3, that corresponding to the time slot specified by the time slot setting switch 5 is output as the pulse APW4. As in the first embodiment, the result of the logic OR operation on the pulses APW4 and APW1 is used as the aperture window signal APW2.

Accordingly, when the unique word contained in a signal from a particular terminal station is deviated from the proper timing, the width of the pulse APW4 is narrowed stepwise, thus making it possible to detect the degree of deviation from the proper position. Specifically, the display section 8 stops lighting in the process of narrowing the width of the pulse APW4 stepwise while the unique word contained in the signal from the particular terminal station is detected by the unique word detecting circuit 2. Based on the width of the pulse APW4 set at the time when the display section 8 stops lighting, the amount of deviation can be estimated, and the estimated amount of deviation is notified to the terminal station in question so that the transmission timing of this terminal station may be adjusted. In such a case, the transmission timing of the terminal station is provisionally shifted in the positive (+) or negative (−) direction to learn in which direction the transmission timing is deviated, and repeating the adjustment twice can, in most cases, correct the transmission timing. The width of the pulse APW4 may be so set as to be variable only in one of the positive (+) and negative (−) directions with respect to the proper position so that the polarity of deviation can be specified from the outset.

Also in the second embodiment, the time slot setting switch 5, the identity circuit 6, the display section 8, the width setting switch 9, the aperture window generator 10, and the AND circuit 11 may be formed as a package separate from the master system, as indicated by the dashed line and symbols A and B in FIG. 6, so that the package may be detachable from the master system, as in the first embodiment.

A third embodiment according to the present invention will be now described.

Figure 9:
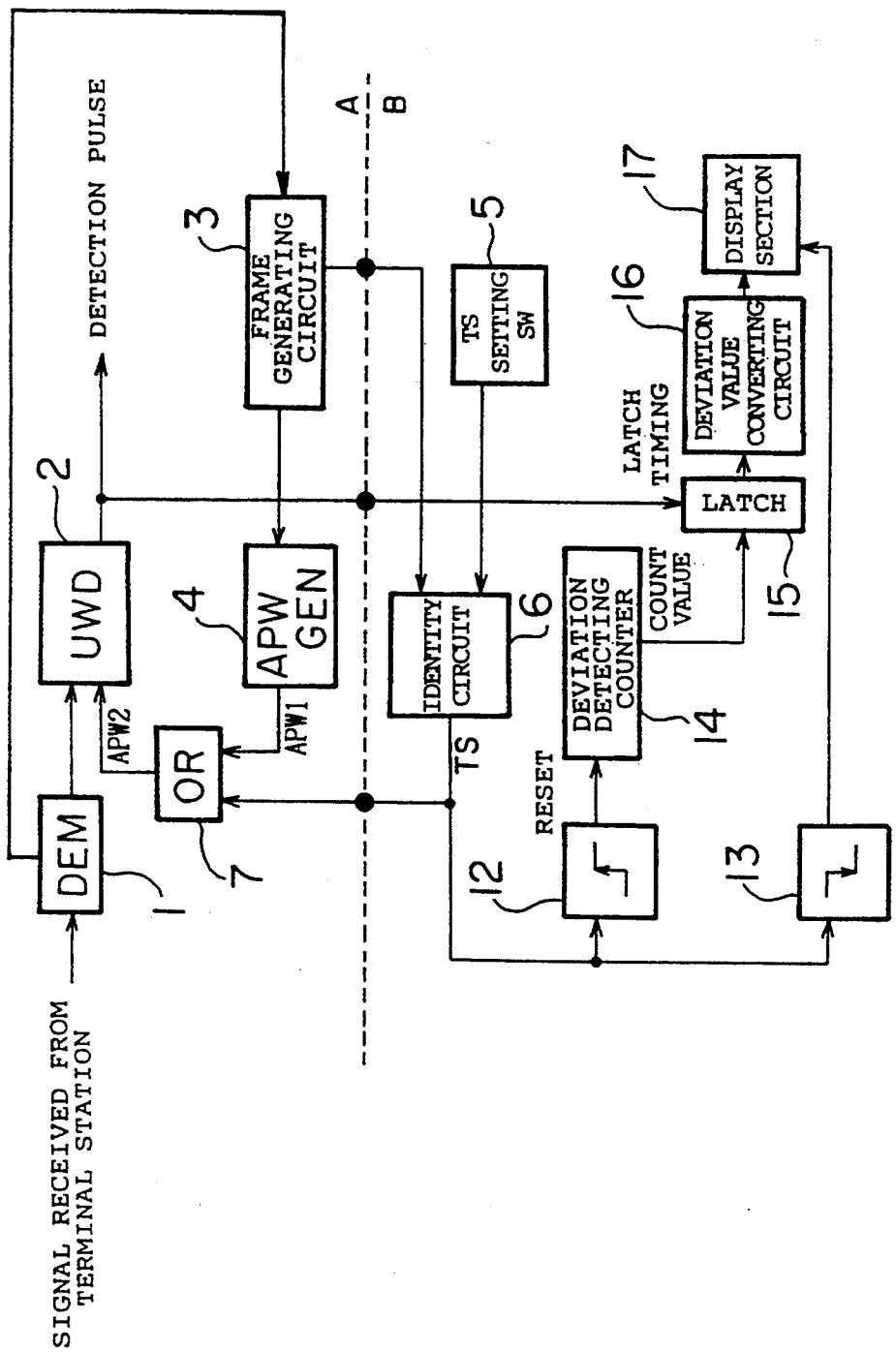
FIG. 9 is a block diagram of a master terminal system according to a third embodiment of the present invention.

FIG. 9 is a block diagram of a master terminal system according to the third embodiment of the invention, and illustrates, in particular, a detector for detecting the deviation of a unique word from the proper position. In the third embodiment, the arrangement of the first embodiment is modified such that the amount of deviation of a unique word from the proper position can be numerically displayed. The arrangement of the third embodiment is basically identical with that of the first embodiment; therefore, like reference numerals and symbols are used to denote like elements, and description of such elements is omitted. Only the different features will be described below.

A leading edge detecting circuit 12 detects the leading edge of the signal TS generated by the identity circuit 6, and supplies a detection signal to a deviation detecting counter 14 as a reset signal. The deviation detecting counter 14 is reset by this reset signal, and the count value thereof is incremented in response to the clock signal up to "256." Namely, the deviation detecting counter 14 starts counting at the rise of the signal TS and continues the counting operation until the fall of the same signal, the count value being output all the time. A latch 15 latches the count value of the deviation detecting counter 14 when supplied with a detection pulse from the unique word detecting circuit 2. A deviation value converting circuit 16 converts the count value latched by the latch 15 into an amount of deviation of the detected unique word from the proper position. The deviation value converting circuit 16 comprises a ROM, and the amount of deviation is expressed in terms of the number of bits (clock pulses) or the quantity (length) of time, as described later with reference to FIGS. 12 and 13.

A trailing edge detecting circuit 13 detects the trailing edge of the signal TS generated by the identity circuit 6, and supplies a detection signal to a display section 17. The display section 17 uses the output of the trailing edge detecting circuit 13 to latch the output of the deviation value converting circuit 16, and numerically displays the amount of deviation.

Figure 10:
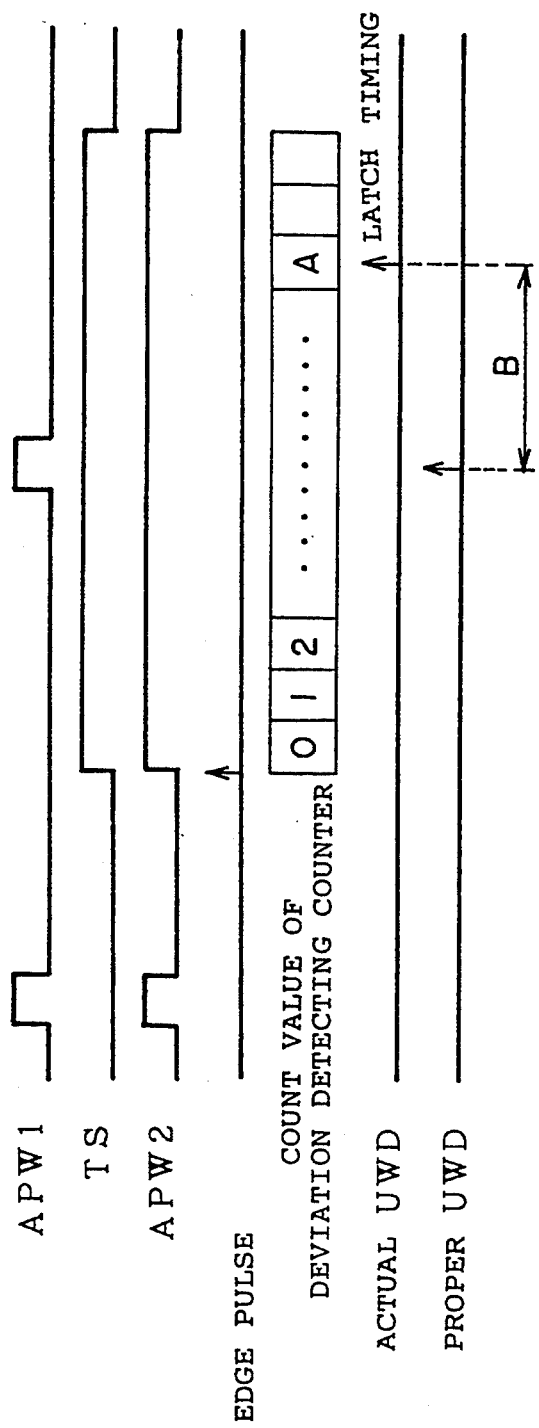
FIG. 10 is a chart illustrating signal waveforms observed at various parts in the third embodiment.

FIG. 10 illustrates signal waveforms observed at various parts in the third embodiment. The aperture window signal APW2 of the third embodiment is identical to the aperture window signal APW2 of the first embodiment. The deviation detecting counter 14 starts counting when supplied with a leading edge pulse from the leading edge detecting circuit 12, that is, from the rise of the signal TS. When a unique word is detected in the specified time slot, a value A that the deviation detecting counter 14 has counted till then is latched. The deviation value converting circuit 16 converts the latched count value A into an amount B of deviation which is a difference between the actually detected position of the unique word and the proper position at which the unique word should be in the specified time slot. The display section 17 displays numerical figures indicating both the amount and direction of the deviation.

Thus, in the third embodiment, when a unique word in the signal transmitted from a terminal station is detected by the open detection method, the amount of deviation from the proper position can be visually confirmed because it is shown as numerical figures which also indicate the direction of deviation. Accordingly, the amount and direction of the deviation may be notified to the terminal station for the adjustment of transmission timing, thus facilitating fine adjustment of the transmission timing.

Figure 11:
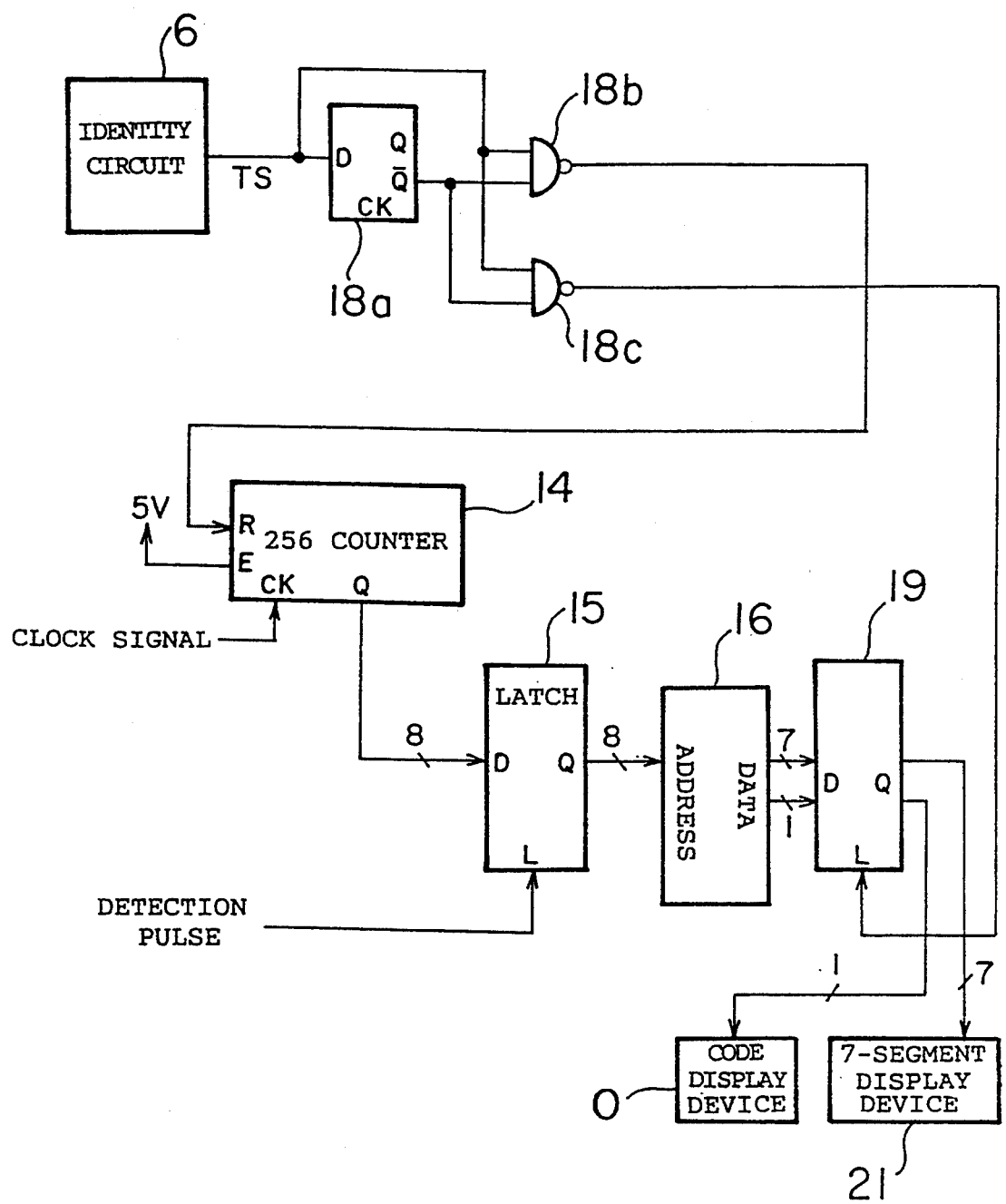
FIG. 11 is a circuit diagram illustrating the arrangement of a principal part of the third embodiment in detail.

FIG. 11 is a circuit diagram illustrating the arrangement of a principal part of the third embodiment in detail. The leading edge detecting circuit 12 and the trailing edge detecting circuit 13 are composed of a D-FF (D flip-flop) 18a and two NAND circuits 18b and 18c. The output of the NAND circuit 18b corresponds to the output of the leading edge detecting circuit 12, and the output of the NAND circuit 18c corresponds to the output of the trailing edge detecting circuit 13. On receiving an 8-bit parallel signal from the latch 15, the deviation value converting circuit 16 converts the input parallel signal into an amount of deviation, in accordance with one of conversion tables shown in FIGS. 12 and 13, and provides an output in which the direction of deviation is represented by "+" or "−" and the absolute quantity of deviation is expressed as the number of bits (clock pulses) or the quantity (length) of time ($\mu$s).

FIG. 12 illustrates an example of the conversion table with which the amount of deviation is converted into a number of bits (clock pulses), and FIG. 13 illustrates another example of the conversion table with which the amount of deviation is converted into a time length in units of 1 $\mu$s on the assumption that the period of clock pulse is 500 ns. By thus employing the time length indication, even in cases where the system is configured using a plurality of terminal stations produced by different manufacturers, it is possible to give flexibility to the mode of deviation notification and to notify the amount of deviation from the master station to a terminal station without requiring any special agreement.

The deviation value converting circuit 16 may alternatively be constructed such that it stores both of the conversion tables shown in FIGS. 12 and 13 and one of the tables is selected by an external command.

Referring again to FIG. 11, the output of the deviation value converting circuit 16 is supplied to a latch 19 forming part of the display section 17. The display section 17 is composed of the latch 19, a code display device 20, and a 7-segment display device 21. Since the output value of the deviation value converting circuit 16 changes each time a detection pulse is output from the unique word detecting circuit 2, it is necessary that only the amount of deviation of the unique word transmitted from the specified terminal station be retained for display. To this end, the latch 19 is provided. The latch 19 is supplied with the output of the trailing edge detecting circuit 13 as a latch timing signal, and supplies one-bit data "+" or "−" indicating the direction of deviation to the code display device 20, as well as 7-bit data indicating the absolute quantity of the deviation to the 7-segment display device 21. The 7-segment display device 21 displays a two-digit figure in decimal notation.

Also in the third embodiment, the time slot setting switch 5, the identity circuit 6, the leading edge detecting circuit 12, the trailing edge detecting circuit 13, the deviation detecting counter 14, the latch 15, the deviation value converting circuit 16, and the display section 17 may be formed as a package separate from the master system, as indicated by the dashed line and symbols A and B in FIG. 9, so that the package may be detachable from the master system, as in the first embodiment.

The foregoing embodiments are explained on the assumption that the systems of the embodiments are used for the adjustment of transmission timing at the time when a new terminal station is installed. It is to be noted, however, that the system according to the present invention can also be used to measure the amount of deviation of a unique word from the proper position during operation of the master terminal system, besides the time of installation of a new terminal station.

As described above, according to the present invention, a determination as to whether the signal transmitted from a specified terminal station is multiplexed at a proper position can be made using a simple circuit, or the deviation of the signal transmitted from a specified terminal station can be measured with a simple circuit. It is, therefore, unnecessary to use a measuring instrument such as a synchroscope, and thus the determination and measurement can be easily performed even by an unskilled person.

The amount by which the signal transmitted from a terminal station is deviated from the proper position is displayed at the LED device or the segment display device for visual confirmation, whereby the measurement is simplified and the amount of deviation can be observed easily.

Also, the amount of deviation of a unique word from the proper position can be easily measured during operation of the network, thus enhancing the maintainability of the network.

Further, the device for detecting whether a unique word is multiplexed in the proper position and the device for measuring the amount of deviation from the proper position can be constructed as a package separate from the master system, which leads to improvement in the efficiency of maintenance work and reduction in the failure rate of the master system.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A master terminal system for a star network in which a master station transmits a continuous signal to a plurality of terminal stations, and each terminal station transmits a signal to the master station according to a time-division multiple access procedure, comprising:
   frame generating means for receiving a signal from one of said terminal stations, said signal including a frame timing signal and a plurality of time slots each having clock signals, said frame generating means counting a number of time slots successively supplied thereto after a frame start and a number of clock signals in each time slot, based on said frame timing signal and said clock signals in the received signal, and outputting a time slot count value and a clock count value, respectively;

aperture window generating means, coupled to said frame generating means, for generating an aperture window signal having a width at least equal to a time width of a unique word contained in said received signal, at a position where the unique word should be within the time slot, based on the clock count value supplied from said frame generating means;

input means for entering a number representing an order of a predetermined time slot within a frame;

search pulse generating means, coupled to said input means and said frame generating means, for generating a search pulse having a predetermined width at least greater than the time width of the unique word when the time slot count value output from said frame generating means coincides with the number representing the order of the time slot supplied from said input means;

OR operation means, Coupled to said aperture window generating means and said search pulse generating means, for outputting a gate signal representing a result of a logic OR operation performed on the aperture window signal generated by said aperture window generating means and the search pulse generated by said search pulse generating means;

unique word detecting means, coupled to said OR operation means and receiving said received signal for detecting the unique word contained in the received signal, and for outputting a detection pulse only if the gate signal is being supplied thereto from said OR operation means when the unique word is detected; and display means, coupled to said unique word detecting means, for indicating that the unique word has been detected in said predetermined time slot, based on said result of a logic OR operation performed on the detection pulse output from said unique word detecting means and the search pulse generated by said search pulse generating means.

2. The master terminal system according to claim 1, wherein said search pulse generating means includes setting means for setting the width of the search pulse to a desired width.

3. The master terminal system according to claim 1, wherein said search pulse generating means includes:

width input means for entering a pulse width;

first pulse generating means for generating a pulse having the width entered from said width input means, at a position where the unique word should be within the time slot, based on the clock count value output from said frame generating means;

second pulse generating means for generating a pulse having a width equal to a time slot width when the time slot count value output from said frame generating means coincides with the number representing the order of the time slot, supplied from said input means; and AND operation means for outputting said search pulse representing a result of a logic AND operation performed on the pulses generated by said first and second pulse generating means, respectively.

4. The master terminal system according to claim 1, further comprising package means for mounting thereon said input means, said search pulse generating means, and said display means, said package means being detachable from said master terminal system.

5. A master terminal system for a star network in which a master station transmits a continuous signal to a plurality of terminal stations, and each terminal station transmits a signal to the master station according to a time-division multiple access procedure, comprising:

frame generating means for receiving a signal from a respective one of said terminal stations, said signal including a frame timing signal and a plurality of time slots having clock signals, said frame generating means counting a number of time slots successively supplied thereto after a frame start and a number of clock signals in each time slot, based on said frame timing signal and said clock signals in said received signal, and outputting a time slot count value and a clock count value, respectively;

aperture window generating means, coupled to said frame generating means, for generating an aperture window signal having a width at least equal to a time width of a unique word contained in said received signal, at a position where the unique word should be within the time slot, based on the clock count value supplied from the said frame generating means;

input means for entering a number representing an order of a predetermined time slot within a frame;

search pulse generating means, coupled to said input means and said frame generating means, for generating a search pulse having a predetermined width at least greater than the time width of the unique word when the time slot count value output from said frame generating means coincides with the number representing the order of the time slot supplied from said input means;

OR operation means, coupled to said aperture window generating means and said search pulse generating means, for outputting a gate signal representing a result of a logic OR operation performed on the aperture window signal generated by said aperture window generating means and the search pulse generated by said search pulse generating means;

unique word detecting means coupled to said OR operation means and receiving said received signal, for detecting the unique word contained in the received signal, and for outputting a detection pulse only if the gate signal is being supplied thereto from said OR operation means when the unique word is detected;

deviation detecting means for counting a number of the clock signals to generate a count value, wherein a counting operation by said deviation detecting means is started at rise timing of the search pulse generated by said search pulse generating means;

latch means, coupled to said deviation detecting means, for latching the count value of said deviation detecting means when the detection pulse is output from said unique word detecting means; and display means for displaying an amount of deviation of the unique word, detected by said unique word detecting means, from a proper position based on the count value latched by said latch means.

6. The master terminal system according to claim 5, wherein said deviation detecting means includes edge detecting means for detecting a leading edge of the search pulse generated by said search pulse generating means, said deviation detecting means being reset and starting the counting of the clock signals in accordance with an edge detection output from said edge detecting means.

7. The master terminal system according to claim 5, wherein said display means includes:

edge detecting means for detecting a trailing edge of the search pulse generated by said search pulse generating means; and latch means for latching the amount of deviation, in accordance with an edge detection output from said edge detecting means.

8. The master terminal system according to claim 5, wherein said display means includes means for displaying the amount of deviation by means of a time-indicative value.

9. The master terminal system according to claim 5, wherein said display means includes means for displaying the amount of deviation by means of the number of the clock signals.

10. The master terminal system according to claim 5, further comprising package means for mounting thereon said input means, said search pulse generating means, said deviation detecting means, said latch means, and said display means, said package means being detachable from said master terminal system.

* * * * *